(12) United States Patent
Agam et al.

(10) Patent No.: US 6,198,470 B1
(45) Date of Patent: Mar. 6, 2001

(54) COMPUTER INPUT DEVICE

(76) Inventors: Uri Agam, 3 Asher Bar-Levi Street, Petach Tikvah 49553; Eli Gal, 8 Simtat Albert Street, Ramat Gan 52289; Eli Ben-Bassat, 28 Keren Hayesod Street, Holon 58483; Ronen Jashek, Meshek 4, Yashresh Village 76838; Yaron Baratz, 4 Bloch Street, Givatayim 53229, all of (IL)

( * ) Notice: Subject to any disclaimer, the term of this patent is extended or adjusted under 35 U.S.C. 154(b) by 0 days.

(21) Appl. No.: 09/221,561

(22) Filed: Dec. 28, 1998

(51) Int. Cl.[7] ........................................... G09G 5/08
(52) U.S. Cl. .................. 345/157; 345/173; 345/177; 178/18.01; 178/18.03; 178/18.04
(58) Field of Search ..................... 345/156, 157, 345/158, 173, 176, 177; 178/18.01, 18.03, 18.04

(56) References Cited

U.S. PATENT DOCUMENTS

| | | | |
|---|---|---|---|
| 4,375,674 | * 3/1983 | Thornton | 345/419 |
| 4,682,159 | 7/1987 | Davison | 340/709 |
| 4,988,981 | 1/1991 | Zimmerman et al. | 340/709 |
| 5,059,959 | * 10/1991 | Barry | 345/145 |
| 5,444,462 | 8/1995 | Wambach | 345/158 |
| 5,453,759 | 9/1995 | Seebach | 345/158 |
| 5,489,922 | 2/1996 | Zloof | 345/156 |
| 5,594,469 | 1/1997 | Freeman et al. | 345/158 |
| 5,638,092 | 6/1997 | Eng et al. | 345/158 |
| 5,683,092 | 11/1997 | Ito et al. | 277/235 B |
| 5,686,942 | 11/1997 | Ball | 345/158 |
| 5,717,413 | 2/1998 | Mizouchi | 345/7 |
| 5,729,475 | 3/1998 | Romanik, Jr. | 364/559 |
| 5,736,976 | 4/1998 | Cheung | 345/168 |
| 5,754,126 | 5/1998 | Hilbrink et al. | 341/20 |
| 5,757,361 | * 5/1998 | Hirshik | 345/156 |
| 5,790,100 | 8/1998 | Kikinis | 345/158 |

OTHER PUBLICATIONS

"Virtual Integrated Mouse," IBM Technical Disclosure Bulletin, Mar. 1, 1988, vol. 30, Iss. 10, pp 398–401.*

* cited by examiner

*Primary Examiner*—Richard A. Hjerpe
*Assistant Examiner*—Benjamin D. Bowers
(74) *Attorney, Agent, or Firm*—Abelman, Frayne & Schwab

(57) ABSTRACT

A digital input device for entering data into a digital system, comprises at least two remote sensors and a control unit. A working area is set up in proximity to the sensors and the position of an object within the working area is detected by the input device based on data provided by each sensor and transmitted, by said control unit, to said digital system. The position of an object outside said working area, if detected by said input device, is rejected by said control unit and is not transmitted to said digital system. The sensors can be ultrasonic sensors and the object can be a part of the body of a user. Use of a third sensor allows three-dimensional detection of the object.

20 Claims, 3 Drawing Sheets

COMPUTER INPUT DEVICE

FIELD OF THE INVENTION

The present invention relates to a computer input device, and more particularly but not exclusively to a computer input device which is operable to manipulate a point or cursor, in an image or on a screen.

BACKGROUND OF THE INVENTION

Computer input devices such as the keyboard, touchscreen and mouse are well known. However these comprise moving parts and are thus subject to wear. Wired input devices which are at least in part worn or held by the user, are known from U.S. Pat. Nos. 4,682,159 and 4,988,981.

In some cases wires are found to be inconvenient or otherwise undesirable, and there are thus known wireless cursor manipulation devices which are worn or held by a user and examples are known from U.S. Pat. Nos. 5,444,462, 5,453,759, 5,754,126, 5,736,976, 5,638,092, 5,790,100, 5,489,922 and 5,729,475.

Systems in which no device is either worn or held by the user and which use electromagnetic radiation to monitor the location of a body part are known from U.S. Pat. Nos. 5,717,413 and 5,686,942. In the latter case it is also disclosed to use ultrasonic waves.

SUMMARY OF THE INVENTION

According to a first aspect of the present invention there is provided a digital input device for entering data into a digital system. The device comprises at least two remote sensors and a control unit. A working area is set, that is to say typically but not necessarily predefined, in proximity to the remote sensors, and the position of an object within the working area is detected by the input device based on data provided by the sensors and transmitted, by the control unit, to the digital system. However, if any of the parameters of the position of an object are detected to be outside the working area, then they are rejected by the control unit and are not transmitted to the digital system. Preferably such parameters are replaced by values indicating the edge of said working area.

The sensors are preferably ultrasonic transducers, and preferably each detect the distance of the object therefrom. The control unit may convert the detected distances into co-ordinates relative to an origin within the working area. The object may typically be a part of the body of a user, for example a finger.

Preferably, the second sensor is placed perpendicularly to the first sensor.

In a particularly preferred embodiment, an angle subtended by the object with an axis normal to at least one of the sensors, is ignored in obtaining the distance of the object from the sensor.

There may be provided a third sensor, enabling the control unit to calculate 3-dimensional co-ordinates of the object within the working area.

According to a second aspect of the present invention there is provided a digital input device for entering data into a digital system, comprising a first and a second remote sensor and a control unit. A working area is set in proximity to the sensors and the position of an object within the working area is detected by the input device based on data provided by each sensor and transmitted, by the control unit, to the digital system. The position of an object outside the working area, if detected by the input device, is rejected by the control unit and is not transmitted to the digital system. The object is part of the body of a user. Any parameters that are found to be beyond the working area are preferably replaced by parameters indicating the edge of the working area. Thus the point or cursor never moves off the screen.

According to a third aspect of the present invention there is provided a digital input device for entering data into a digital system, comprising at least a first and a second remote sensor and a control unit. A working volume is set in proximity to the remote sensors and the position of an object within the working volume is detected by the input device based on data provided by each sensor and transmitted, by the control unit, to the digital system. However the position of an object outside the working volume, if detected by the input device, is rejected by the control unit and is not transmitted to the digital system. Any parameters that are found to be beyond the working area are preferably replaced by parameters indicating the edge of the working area. Thus the point or cursor never moves off the screen.

BRIEF DESCRIPTION OF THE DRAWINGS

For a better understanding of the invention and to show how the same may be carried into effect, reference will now be made, purely by way of example, to the accompanying drawings in which.

DESCRIPTION OF THE PREFERRED EMBODIMENTS

Figure 1:
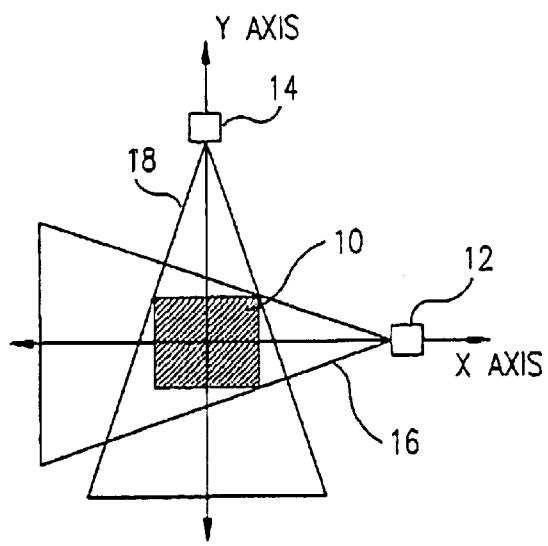
FIG. 1 shows the layout of a first embodiment of the present invention.

FIG. 1 is a diagram showing the layout of a first embodiment of a computer input device operative in accordance with the present invention. In FIG. 1 a working area 10 is defined in which a user, or at least a moving part of the user's body, such as a finger, may be expected to be located. A first sensor 12 is located at a given distance from the working area 10 in a first direction and a second sensor 14 is preferably located at the same distance away from the working area 10 but in a second direction which is perpendicular to the aforementioned first direction.

A defined working area, such as that indicated by reference numeral 10 in FIG. 1, is desirable as it permits the user easily to choose not to transmit his movements to the cursor, in the same way that lifting a mouse deactivates movement of the cursor.

Although FIG. 1 shows two sensors, and is limited to two-dimensional measurement, it is further possible to add a third sensor so that three-dimensional information can be obtained.

Although the example has been given of a user's finger, the object does not need to be as small as a finger, in contrast to the prior art citation 5,686,942, in which a point object is required.

Figure 2:
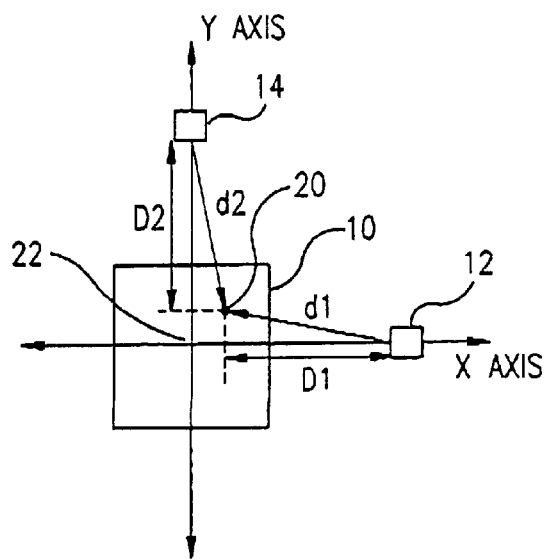
FIG. 2 shows how the layout of FIG. 1 may be used to obtain the co-ordinates of an object within the working area.

Each sensor, 12, 14 is preferably an ultrasonic transducer, and is able to scan a cone shaped area denoted by triangles 16 and 18 respectively by emitting a series of ultrasonic pulses. By timing the reflections a distance to the object is calculated, as described below with respect to FIG. 2. The distance to a reference point, preferably at the center of the working area 10, is known to the system and, as shown in FIG. 2, this enables distances to be calculated from the reference point to an object, such as the user's hand, which is being measured. Furthermore the ability to discern distance allows objects outside the working area to be rejected.

FIG. 2 shows how the embodiment of FIG. 1 may be used to obtain the co-ordinates of an object 20 with respect to an origin 22 at the center of the working area 10. The distance from each sensor 12, 14, to the origin 22 is known in advance. A distance d1 is measured from object 20 to the sensor 12, and distance d2 is measured to the second sensor 14. The projection of these lengths d1 and d2 onto the respective X and Y axes are indicated by D1 and D2.

Thus D1=d1 cos $\alpha$, and D2=d2 cos $\beta$ where $\alpha$ and $\beta$ are the angles respectively which d1 and d2 subtend with their respective axes.

If the system is appropriately set up it can generally be assumed that $\alpha$ and $\beta$ are small angles. Thus cos $\alpha$ and cos $\beta$ may be approximated to 1. Thus D1=d1 and D2=d2. Each co-ordinate from the origin can then be obtained by subtracting D1 and D2 from the known distance of the sensor to the origin.

The resulting co-ordinates are in a form that can be utilized by appropriate software in order to manipulate a cursor on a screen. The co-ordinates, which are in relation to the working area can preferably be reused directly with a new origin in the center of the screen, or in the case of 3D, in the center of a box receding from the screen.

In addition to detecting position, as described above, it is also possible to compare successive position measurements and thus to obtain motion. It is thus possible to arrange the device so that stationary objects are ignored.

Figure 3:
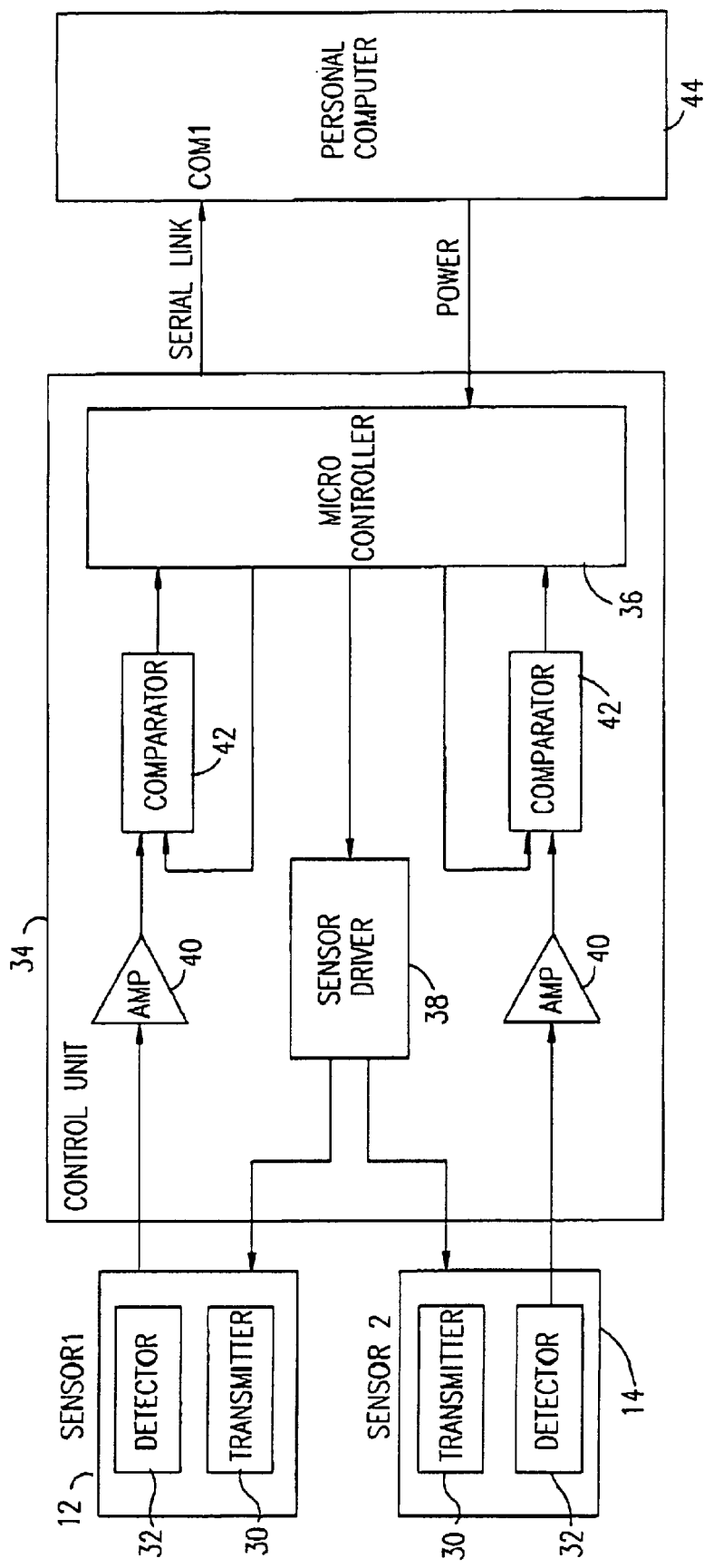
FIG. 3 is a block diagram of an embodiment of the present invention.

FIG. 3 is a block diagram of au embodiment operative in accordance with the present invention incorporated into a computer system. Transducers 12 and 14 each comprise a transmitter 30 which emits ultrasonic pulses and a detector 32 which senses ultrasonic energy, from the pulses, as it is reflected back from an object.

A control unit 34 comprises a microcontroller 36, which operates a sensor driver 38 to send a burst signal to the transmitters 30. Each burst signal is transformed into an ultrasonic pulse and an echo is received by the detector 32. The frequency of the burst signal is typically 50–200 Hz but the frequency is not critical.

The echo is reconverted by the detectors 32 into an electronic signal and is amplified by amplifier 40. It is then converted into a digital signal using comparator 42 and the microcontroller then compares the time of receipt with the time of transmission to arrive at a distance of the object from the sensor. At this point any echoes from the outside of the defined working volume 10 are rejected and co-ordinates are calculated as described with respect to FIG. 2 above.

The control unit is connected to a computer 44, preferably by a standard serial link in the same way that a mouse is generally connected. The co-ordinates of the object, obtained as above, are transmitted via the serial link and, as they are in digital form, can be utilized by the computer 44 without needing extensive driver software.

Figure 4:
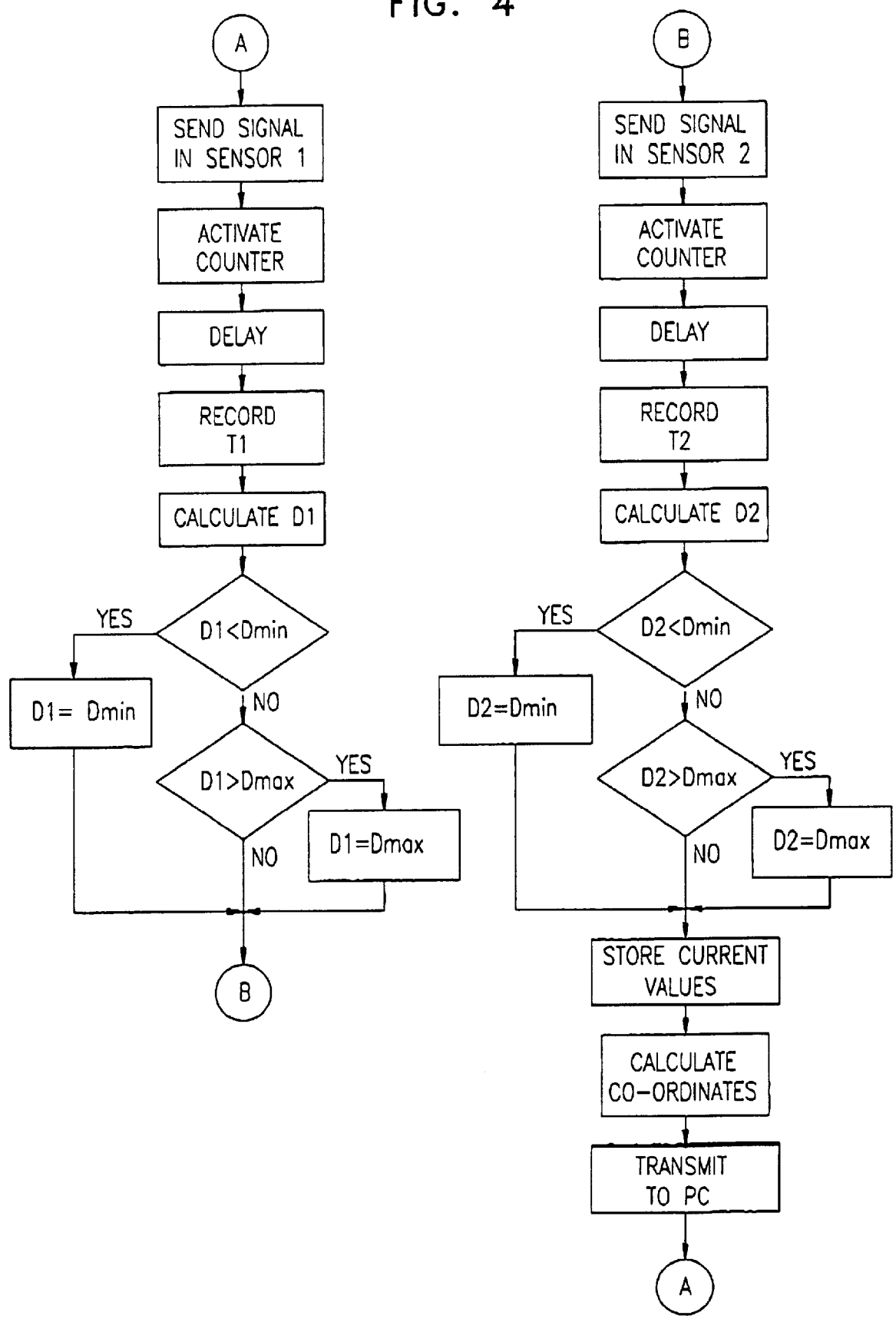
FIG. 4 is a flow chart showing operation of an embodiment of a device according to the present invention.

FIG. 4 is a flow chart showing the sequence of operation of an embodiment according to the present invention. In FIG. 4 signals are sent via each of the sensors and a counter is activated. As echoes are received the appropriate delays are recorded and the distances D1 and D2 are calculated as described above with respect to FIG. 2. A loop is then entered in which values outside the working volume, defined by $D_{max}$ and $D_{min}$ are excluded, or preferably are forced to $D_{max}$ and $D_{min}$, the current values are stored and the co-ordinates themselves are calculated and transmitted to the computer. Although the step labeled "transmit to PC" is shown below the step "calculate co-ordinates" at the base of the flowchart of FIG. 4, the skilled person will appreciate that this step could equally well be inserted at numerous other points therein.

The forcing of the values to $D_{max}$ and $D_{min}$ as appropriate ensures that, when the object passes the edge of the screen, the cursor remains at the edge of the screen and continues to respond only to that value or those values which are still within the working area.

There is thus provided a digital data input device which relies solely on remote sensing of the position of an object, wherein the object is any object not transparent to the sensing pulses, and does not require the user to wear or hold any device. Furthermore the user can deactivate data input simply by moving the object outside the predefined working area.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited to what has been particularly shown and described hereinabove. Rather, the scope of the present invention is defined only by the claims that follow:

What is claimed is:

1. A digital input device for entering data into a digital system, comprising at least a first and a second remote sensor and a control unit, wherein a working area is set in proximity to the remote sensors and wherein parameters, within the working area, of a position of an object are detected by the input device based on data provided by each sensor and transmitted, by said control unit, to said digital system, and parameters outside said working area, of said object, if detected by said input device are rejected by said control unit and are not transmitted to said digital systems, wherein the second sensor is placed perpendicularly to the first sensor and an angle subtended by the object with an axis normal to at least one of said sensors, is ignored in obtaining the distance of the object from said sensor.

2. A device according to claim 1, wherein said rejected parameters are replaced by parameters representing an edge of said working area.

3. A device according to claim 1, wherein said working area is predefined with respect to said remote sensors.

4. A device according to claim 1, wherein said sensors are ultrasonic transducers.

5. A device according to claim 1, wherein said sensors each detect the distance of said object therefrom and wherein said control unit converts said detected distances into co-ordinates relative to an origin within said working area.

6. A device according to claim 1, wherein the object is a part of the body of a user.

7. A device according to claim 4, wherein the object is a part of the body of a user.

8. A device according to claim 5, wherein the object is a part of the body of a user.

9. A device according to claim 1, having a third sensor, and wherein said control unit is operable to calculate 3-dimensional co-ordinates of said object within said working area.

10. A device according to claim 9, wherein the object is a part of the body of a user.

11. A device according to claim 1, wherein the position of the object is translated into a point in a computerized image.

12. A digital input device for entering data into a digital system, comprising at least a first and a second remote sensor and a control unit, wherein a working volume is set in proximity to the remote sensors and wherein parameters, within the working volume, of a position of an object are detected by the input device based on data provided by each sensor and transmitted, by said control unit, to said digital system, and parameters outside said working volume, of said object, if detected by said input device are rejected by said control unit and are not transmitted to said digital system, wherein the second sensor is placed perpendicularly to the first sensor and an angle subtended by the object with an axis normal to at least one of said sensors, is ignored in obtaining the distance of the object from said sensor.

13. A device according to claim 12, wherein said rejected parameters are replaced by parameters representing an edge of said working area.

14. A device according to claim 12, wherein said sensors are ultrasonic transducers.

15. A device according to claim 12, wherein said sensors each detect the distance of said object therefrom and wherein said control unit converts said detected distances into co-ordinates relative to an origin within said working volume.

16. A device according to claim 12, wherein the object is a part of the body of a user.

17. A device according to claim 14, wherein the object is a part of the body of a user.

18. A device according to claim 15, wherein the object is a part of the body of a user.

19. A device according to claim 12, having a third sensor, and wherein said control unit is operable to calculate 3-dimensional co-ordinates of said object within said working volume.

20. A device according to claim 12, wherein said working volume is predefined with respect to said remote sensors.

* * * * *